United States Patent [19]
Koster

[11] 3,745,372
[45] July 10, 1973

[54] ASYNCHRONOUS ADDING-SUBTRACTING DEVICE

[75] Inventor: Johannes Karolus Andread Koster, Hilversum, Netherlands

[73] Assignee: U.S. Philips Corporation, New York, N.Y.

[22] Filed: Dec. 13, 1971

[21] Appl. No.: 207,018

[30] Foreign Application Priority Data

Dec. 16, 1970 Netherlands ....................... 7018307

[52] U.S. Cl. .......... 307/222 C, 307/221 C, 307/251
[51] Int. Cl. ............................................ H03k 21/00
[58] Field of Search .................... 307/222, 224, 221, 307/251, 279, 304; 328/44

[56] References Cited

UNITED STATES PATENTS

| | | | |
|---|---|---|---|
| 3,116,456 | 12/1963 | Riker | 307/224 R |
| 3,227,893 | 1/1966 | Frank | 328/44 |
| 3,593,032 | 7/1971 | Ma | 307/224 C |
| 3,500,022 | 3/1970 | Toscano | 307/222 R |
| 3,323,067 | 5/1967 | Eckl | 307/222 R |
| 3,551,826 | 12/1970 | Sepe | 328/44 |
| 3,506,921 | 4/1970 | Wanner | 328/44 |
| 3,263,097 | 7/1966 | Noble | 307/224 R |
| 3,258,696 | 6/1966 | Heymann | 307/224 R |
| 2,735,005 | 2/1956 | Steele | 328/44 |

OTHER PUBLICATIONS

Walker, Electronic Design 12, June 6, 1968, pp. 74–78, "Carry Out Your Up–Down Counter Designs."

*Primary Examiner*—John W. Huckert
*Assistant Examiner*—R. E. Hart
*Attorney*—Frank R. Trifari

[57] ABSTRACT

As asynchronous adding-subtracting device comprising a cascade-connection of N sections, each of which comprises a coupling circuit and a counting flipflop. Each counting flipflop comprises a counting input and two signal outputs supplying inverted output signals. Each coupling circuit comprises two input terminals which are connected to the signal outputs of a counting flipflop of a preceding section, one output terminal which is connected to the counting input of the counting flipflop of the same section, and two control terminals. Each of the input terminals is connected, via the conducting path of an electronic switch, to the input of a differentiator, the output of which is connected to the output terminal of the coupling circuit. The control inputs of the electronic switches are connected to the control terminals and are connected to condition inputs via pulse-slope reducers. The pulses to be counted are applied to the counting input of the first counting flipflop. The condition signals determining the direction of counting are applied to the condition inputs. When the signals applied to the conditions inputs are exchanged, the voltage variation occurring on these terminals is applied to the control terminal by the pulse-slope reducers at a very small steepness, so that the electronic switches are gradually switched on and any voltage peaks produced by the differentiators cannot change the state of the counting flipflops.

4 Claims, 3 Drawing Figures

INVENTOR.
JOHANNES K.A. KOSTER
BY
AGENT

INVENTOR.
JOHANNES K.A. KOSTER
BY
AGENT

ASYNCHRONOUS ADDING-SUBTRACTING DEVICE

The invention relates to an asynchronous adding-subtracting device comprising a counting pulse input terminal for receiving counting pulses, two condition inputs for receiving two condition signals determining the counting direction, and a cascade connection of N sections. The first section comprises a counting flipflop, the N−1 remaining sections each comprise a coupling circuit and a counting flipflop, in which the counting flipflops are provided with a counting input and two signal outputs supplying inverted output signals. The counting input of the first counting flipflop being connected to the counting pulse input terminal. Each coupling circuit comprises a differantiator provided with a signal input and a signal output terminal, two input terminals which are connected to the signal outputs of the counting flipflops of the preceding section, one output terminal which is connected to the counting input of the counting flipflop of the same section, and two control terminals which are coupled to the condition inputs.

In a known asynchronous adding-subtracting device, the coupling circuits comprise signal paths which extend between the input terminals and the output terminal, and which are provided with gate circuits.

The gate circuits are connected to the control terminals of the coupling circuits. The condition signals applied to the control terminals via the condition inputs, have a value such that one of the gate circuits of each coupling circuit interrupts the signal path in which this gate circuit is provided, the other gate circuit closing the signal path in which it is provided. By exchanging the condition signals applied to the signal condition inputs, the interrupted signal path is closed, and the closed signal path is interrupted. The direction of counting depends on which of the two signal paths in each coupling circuit is closed. A counting pulse increases or decreases the counter contents by unity.

If the signal output of a counting flipflop, which is connected to the counting input of the next counting flipflop via a closed signal path, has a high output voltage, the high voltage of the counting input will be replaced by a low voltage, when the counting direction is reversed under the control of the condition signals. This negative change of the voltage of the counting input will cause the counting flipflop to change its state, so that the counting contents of the counter are disturbed. So as to prevent this, the coupling circuits of this known adding-subtracting device comprise two capacitors. These capacitors are provided between the input terminals and the gate circuits, and form differentiators in conjunction with resistors of the gate circuits. During the time that no counting pulse is applied to the counting pulse input terminal, the output signals of the counting flip-flops are constant. The capacitors block these constant output signals so that no signals are applied to the gate circuits.

It is thus achieved, that the reversal of the counting direction is not accompanied by a change of the voltages present at the counting inputs of the counting flipflop. The reversal of the counting direction, consequently, does not influence the counting contents.

This known counting device has the drawback that for achieving proper operation of the counting device, each coupling circuit comprises two capacitors and two gate circuits, each of which is composed of a resistor and a diode, so that the counting device is not very suitable for realization in an integrated form.

This is objectionable, in particular in the case of counting devices having a high counting capacity, i.e. comprising many sections.

The invention has for its object to provide an asynchronous adding-subtracting device comprising less complicated coupling circuits.

To this end, the device according to the invention is characterized in that each coupling circuit comprises two electronic switches, each of which is provided with a control input and a conducting path. The control inputs form the control terminals of the coupling circuit. The conducting paths of the switches are provided between the input terminals of the coupling circuit and the signal input terminal of the differentiator. The signal output terminal of the differentiator is connected to the output terminal of the coupling circuit. Each condition input is connected to a control terminal of each coupling circuit via a pulse-slope reducer for gradually switching on the switch coupled to the control terminal after the condition signal has been switched on.

In order that the invention may be readily carried into effect, some embodiments thereof will now be described in detail, by way of example, with reference to the accompanying diagrammatic drawings, in which.

Figure 1:
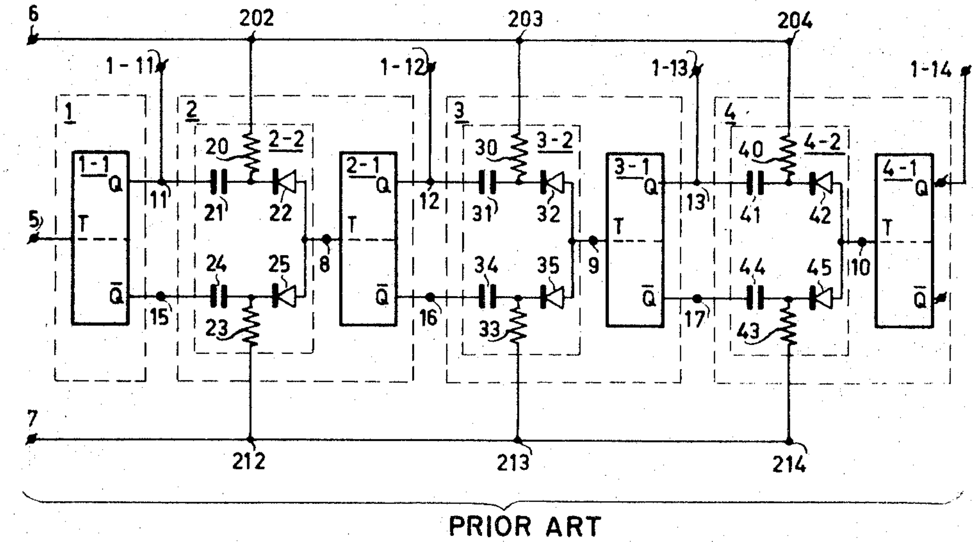
FIG. 1 shows the circuit arrangement of a known asynchronous adding-subtracting device.

FIG. 1 shows a known asynchronous reversible adding-subtracting device. This counting device is composed of a cascade connection of, for example, four sections 1, 2, 3 and 4. Each section comprises a counting flipflop 1—1, 2–1, 3–1, and 4–1. These counting flipflops are either in a set state, which is characterized by a high output voltage of the signal output Q and a low output voltage of the signal output $\overline{Q}$, or in a reset state which is characterized by a low output voltage of the signal output Q and a high output voltage of the signal output $\overline{Q}$. These counting flipflops change over from the set state to the reset state or vice versa, if a signal applied to the counting input T shows a negative voltage variation. For coupling the counting flipflops, the sections 2, 3 and 4 comprise coupling circuits 2—2, 3–2, and 4–2, each of which is provided with input terminals 11, 15; 12, 16; and 13, 17, which are connected to the signal inputs Q and $\overline{Q}$ of the counting flipflop of the preceding section, and with an output terminal 8, 9, and 10 which is connected to the counting input T of the counting flipflop of the same section. As a result, the signal output Q is connected to the counting input T via a first signal path from input terminal 11, 12, and 13, via capacitor 21, 31, and 41, via the cathode-anode junction of diode 22, 32 and, 42 to the output terminal 8, 9 and 10. The signal output $\overline{Q}$ is connected to the counting input T via a second signal path from input terminal 15, 16 and, 17, via capacitor 24, 34 and, 44 and the cathode-anode junction of diode 25, 35 and, 45 to output terminal 8, 9 and 10. In order to enable control of the signal paths, the cathodes of the diodes 22, 32 and 42 are connected to a first condition input 6 via resistors 20, 30 and 40 and the control terminals 202,

203 and 204, and the cathodes of the diodes 25, 35 and 45 are connected to a second condition input 7 via resistors 23, 33 and 43 and control terminals 212, 213, 214. Consequently, differentiators are formed by the capacitors 21, 24; 31, 34; and 41, 44 and the resistors 20, 23; 30, 33; and 40, 43, and gate circuits are formed by the diodes 22, 25; 32, 35; and 42, 45 and the resistors 20, 23; 30, 33; and 40, 43.

Inverted condition signals are applied to the condition inputs 6 and 7. These signals are chosen such that and of each coupling circuit 2—2, 3–2, and 4–2, either the diode 22, 32, and 42 is biased in the reverse direction with respect to the anode by a high positive voltage applied to the cathode via the resistor 20, 30 and, 40, and the diode 25, 35 and, 45 is biased in the reverse direction with respect to the anode by a low positive voltage which is applied via the resistor 23, 33, and 43, or vice versa.

If the output voltages of these signal outputs Q and $\overline{Q}$ were to change from low to high, the capacitors 21, 24; 31, 34 and 41, 44 would be charged to the high voltage by currents flowing via the resistors 20, 23; 30, 33 and 40, 43. As a result, positive voltage peaks arise across the resistors 20, 23; 30, 33 and 40, 43. These voltage peaks increase the reverse voltages across the diodes 22, 25; 32, 35; and 42, 45 so that the voltages of the anodes of these diodes remain unchanged. If the output voltages of the signal outputs Q and $\overline{Q}$ were to change from high to low, the capacitors 21, 24; 31, 34 and 41, 44 would be discharged to the low voltage by currents flowing via the resistors 20, 23; 30, 33 and 40, 43. Consequently, negative voltage peaks arise across the resistors which counteract the reverse voltages across the diodes 22, 25; 32, 35; and 42, 45. The condition signals are chosen such that, the reverse voltages across the diodes to the cathodes of which high positive voltages are applied with respect to the anodes, are larger than the negative voltage peaks, so that the anode voltages of these diodes do not change, and the reverse voltages across the diodes to the cathodes of which low positive voltages with respect to the anodes are applied, are much smaller than the negative voltage peaks, so that these diodes become conducting. The negative voltage peaks are then applied, via the output terminals 8, 9 and 10, to the counting inputs T of the counting flipflop connected thereto, so that these change their state.

Starting from a position of the counting device where the signal outputs Q of all counting flipflops and the output terminals 1–11, 1–12, 1–13 and 1–14 connected thereto have a low voltage, and the condition signals have values such that only the signal paths between the signal outputs Q and the counting inputs T are closed, the operation of the counting device is as follows:

The first counting pulse applied to counting pulse input terminal 5 sets, due to the negative voltage variation of the trailing edge of this counting pulse, the counting flipflop 1—1 to the set state, which has no further consequences as described above. After one counting pulse, only the voltage of the output terminal 1–11 is high.

The second counting pulse sets the counting flipflop 1—1 to the reset state. In reaction thereto, as described above, the counting flipflop 2–1 is set. After two counting pulses only the output terminal 1–12 has a high voltage.

The third counting pulse sets the counting flipflop 1—1 to the set state, so that the output voltages of the output terminals 1–11 and 1–12 become high. The fourth counting pulse resets the counting flipflop 1—1 to the reset state, so that the counting flipflop 2–1 is reset and hence, the counting flipflop 3–1 is set. After four counting pulses only the output terminal 1–13 has a high voltage.

From the foregoing it follows that for the chosen values of the condition signals, the voltages of the outputs 1–11 to 1–14 represent a binary combination of the sum of the number of counting pulses applied to the counting pulse input terminal 5.

If the condition signals are interchanged, only the signal paths between the signal outputs $\overline{Q}$ and the counting inputs T are closed.

The next counting pulse sets the first counting flipflop 1—1 to the set state so that the negative voltage variation of signal output $\overline{Q}$ sets the counting flipflop 2–1 to the set state and, in reaction thereto, the counting flipflop 3–1 is reset to the reset state. After this counting pulse only the outputs 1–11 and 1–12 have a high voltage which corresponds to the counting position of the counting device after three counting pulses were applied.

The next counting pulse resets the counting flipflop 1—1 to the reset state. After this counting pulse only the output 12 still has a high voltage, which corresponds to the position of the counting device after two counting pulses were added, etc.

As appears from the foregoing, the condition signals determine whether a counting pulse applied to the counting pulse input terminal 5 increases or decreases the contents of the counting device by unity.

During the time that no counting pulses are applied to the counting pulse input terminal 5, the signal outputs Q and $\overline{Q}$ supply direct voltages which are blocked by the capacitors 21, 24; 31, 34 and 41, 44. If the condition signals are interchanged for reversing the direction of counting during this period, the high bias voltage in the reverse direction across one of the diodes of the coupling circuits is changed into a low bias voltage in the reverse direction, and the low bias voltage in the reverse direction across the other diode is changed into a high bias voltage in the reverse direction. The diodes do not become conducting, so that the counting contents are not changed during inversion of the condition signals.

The coupling circuits of this known counting device each comprise two diodes 22, 25; 32, 35; and 42, 45, two resistors 20, 23; 30, 33; and 40, 43, and two capacitors 21, 24; 31, 34; and 41, 44. A counting device of this kind, consequently, is not very suitable for realization in an integrated form. This is objectionable, particularly, if the counting device is to have a large counting capacity, i.e. is to be composed of many sections.

Figure 2:
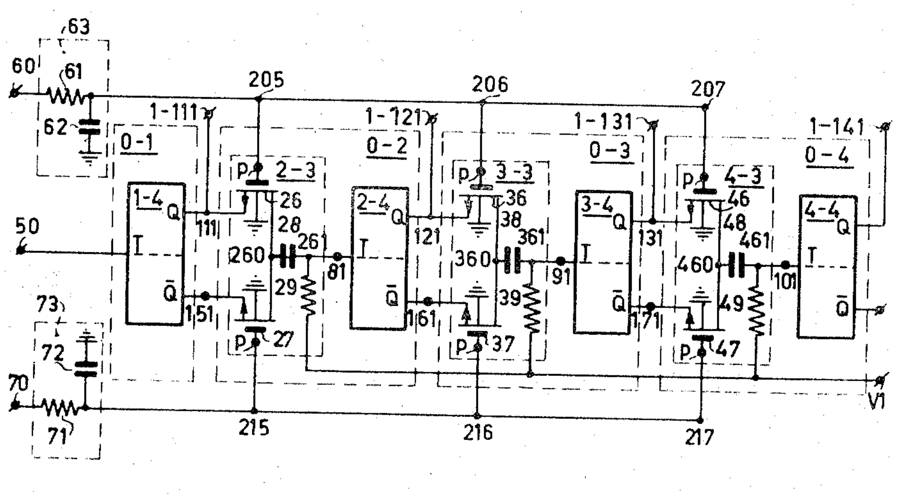
FIG. 2 shows a first embodiment of an asynchronous adding-subtracting device according to the invention.

The invention has for its object to provide an asynchronous reversible adding-subtracting device comprising coupling circuits which can be more readily integrated, and is characterized in that, as is shown in FIG. 2, each coupling circuit 2–3, 3—3, and 4–3 comprises two electronic switches 26, 27; 36, 37; and 46, 47, each of which is provided with a control input *p* and a conducting path. The control inputs *p* form the control terminals 205, 215; 206, 216; 207, and 217 of the coupling circuit 2–3, 3–3, and 4–3, and the conducting paths of the switches 26, 27; 36, 37; and 46, 47 are provided between the input terminals 111, 151; 121, 161; and 131, 171 of each coupling circuit and the signal supply terminal 260, 360 and, 460 of a differentiator 28–29, 38–39 and, 48–49. The signal output terminal 261, 361 and, 461 of the differentiator is connected to the output terminal 81, 91 and, 101 of the coupling circuit. The condition input 60, 70 is connected, via a pulse-slope reducer 63 and, 73, to a control terminal 205, 206, 207; and 215, 216, 217 of each coupling circuit 2–3, 3—3 and 4–3 for gradually switching on, after the condition signal has been switched on, the switch 26, 36, 46; and 27, 37, 47, which is coupled to the control terminal 205, 206, 207; and 215, 216, 217.

The embodiment shown in FIG. 2 of an adding-subtracting device according to the invention comprises, by way of example, four sections 0–1, 0–2, 0–3 and 0–4. The sections comprise counting flipflops 1–4, 2–4, 3–4 and 4—4. These counting flipflops are constructed, for example, as a master-slave storage element of the J-K type. Each storage element comprises two information inputs J and K (not shown), one counting input T and two signal outputs Q and $\overline{Q}$ which are inverted with respect to each other. The contents of these storage elements are characterized in the set state by a high output voltage of the signal output Q, and a low output voltage of the signal output $\overline{Q}$, and in the reset state by a low output voltage of the signal output Q, and a high output voltage of the signal output $\overline{Q}$. As is known, a J-K counting flipflop whose inputs J and K receive no external signals, changes over from the set state to the reset state or vice versa, when a voltage variation from high to low occurs on the counting input T.

The electronic switches 26, 27; 36, 37 and 46, 47 are constructed, for example, as field-effect transistors.

As long as a field-effect transistor (FET) is not bottomed, the resistance variation between the input and the output electrode is approximately inversely proportional to the voltage difference between the gate electrode and the input or output electrode. The resistance of a metal-oxide silicon field-effect transistor of the depletion type used in practice, changes from approximately 20 MOhms for a voltage of −5 Volts between gate electrode, and input electrode to less than 200 Ohms for a voltage of +5 volts between gate electrode and input electrode.

The differentiators are formed by the capacitors 28, 38 and 48 and the resistors 29, 39 and 49. These resistors are connected to a terminal $V_1$ of constant potential. The voltage of this terminal $V_1$ is equal to the high output voltage of the signal outputs Q and $\overline{Q}$.

The operation of the coupling circuits 2–3, 3—3 and 4–3 will be described in detail with reference to coupling circuit 2–3. The description is based on a situation where the capacitor 28 is charged via the resistor 29 to the voltage of terminal $V_1$, for example, to +6 volts, a high voltage of, for example, +6 volts being applied to the control terminal 205 and a low voltage of, for example, −6 volts being applied to the control terminal 215.

If the output voltage of the signal output Q of the counting flipflop 1–4 is low, which corresponds to earth potential, the signal voltage of output $\overline{Q}$ is high, for example, +6 volts. The voltage between the gate electrode and the input electrode of field-effect transistor 26 is +6 volts so that this transistor has a low resistance between the input and the output electrode. The voltage between the input and the output electrode, however, is zero volts so that no current flows. As the output electrodes of the field-effect transistors 26 and 27 are mutually connected, the voltage between the gate electrode and the output electrode of field-effect transistor 27 is −6 volts. The voltage between the gate electrode and the input electrode of this field effect transistor 27 amounts to −12 volts, so that this field effect transistor is cut off. When a counting pulse is supplied to the counting pulse input 50 which is connected to the counting input T of the counting flipflop 1–4, the output voltage of the signal output Q changes from 0 to +6 volts and that of $\overline{Q}$ changes from +6 volts to 0. The voltage between the gate electrode and the input electrode of field-effect transistor 26 then amounts to 0 volts. The resistance between the input and the output electrode then has a value of approximately 600 ohms, so that a current will flow from the input to the output electrode, which discharges the capacitor 28. This causes a discharge current through resistor 29 so that across this resistor a positive voltage peak arises, which is applied to the counting input T of counting flipflop 2–4 via the output 81. This positive voltage peak, superimposed on the high voltage of terminal $V_1$, is not capable of causing counting flipflop 2–4 to change its state as the voltage does not decrease below the high voltage of +6 volts of terminal $V_1$ when, the trailing edge of this peak occurs.

The next counting pulse applied to the counting pulse input terminal 50 changes the output voltage of the signal output Q from +6 volts to 0 volts, and that of signal output $\overline{Q}$ from 0 volts to +6 volts. The voltage between the gate electrode and the input electrode of field-effect transistor 26 again amounts to +6 volts. The voltage between the gate electrode and the output electrode, however, amounts to 0 volts, so that a voltage of −6 volts is present between the input and the output electrode, and a current will flow from the output electrode to the input electrode. This current charges capacitor 28 until the voltage across the capacitor amounts to 6 volts. The charging current of the capacitor 28 causes a negative voltage peak across the resistor 29 which is superimposed on the high direct voltage of terminal $V_1$ and is applied to the counting input T of the counting flipflop 2–4. The leading edge of this negative voltage peak, causing the voltage of counting input T to change from −6 volts to approximately 0 volts, changes the state of counting flipflop 2–4. The voltage variation of the counting flipflop 1–4 occurring on the signal output $\overline{Q}$ changes the voltage between the gate electrode and the input electrode of the field-effect transistor 27 from −6 volts to −12 volts and, since the voltage between the gate electrode and the output electrode has changed from −12 volts to −6 volts via the signal input terminal 62, the conducting path of this field-effect transistor 27 remains very high-ohmic. The variation of the output voltages of signal output $\overline{Q}$, therefore, cannot exert an effect on the counting input T of counting flipflop 2–4,

When the voltages applied to the control terminals 205 and 215 are exchanged, the conducting path of field-effect transistor 26 becomes very high-ohmic and the conducting path of field-effect transistor 27 becomes low-ohmic. As a result, only the voltage variations of the signal output $\overline{Q}$ can exert an effect on the voltage of the output terminal 81 of coupling circuit 2–3.

The operation of the coupling circuits 3—3 and 4–3 is identical to that of coupling circuit 2–3.

As appears from the foregoing, in accordance with the voltage values applied to the control terminals of a coupling circuit, either a signal path is formed between the signal output Q of a counting flip-flop of a preceding section and the counting input T of the counting flipflop of the same section, or a signal path is formed between the signal output $\overline{Q}$ of the counting flipflop of the preceding section and the counting input T of the counting flipflop of the same section. The counting action of the sections 0–1, 0–2, 0–3 and 0–4, consequently, is identical to that of the sections 1, 2, 3 and 4 of the known device shown in FIG. 1. The counting results can be obtained from the output terminals 1–111, 1–121, 1–131 and 1–141.

For changing over the counting device from adding to subtracting or vice versa, the value of the voltage applied to the control terminals 205, 206 and 207 and the value of the voltage applied to the control terminals 215, 216 and 217 are exchanged. The signal input terminal 260, 360, and 460 of the differentiator of each of the coupling circuits 2–3, 3—3 and 4–3 is then disconnected from one of the signal outputs of the counting flipflop 1–4, 2–4 and, 3–4 and connected to the other signal output of this counting flipflop. If this were quickly effected, and if the said one signal output were to have a high voltage and the other signal output a low voltage, the voltage of the signal input terminal 260, 360 and, 460 would quickly change from a high to a low voltage, so that this differentiator would apply a negative voltage peak to the counting input T of counting flipflops 2–4, 3–4 and, 4—4 connected to the signal output terminal 261, 361 and, 461. This voltage peak would change the state of the counting flipflop, so that the counting contents of the counting device would be disturbed. So as to prevent this, the condition signal inputs 60 and 70 are connected to the control terminals 205, 215; 206, 216; and 207, 217 via pulse-slope reducers 63 and 73. These pulse-slope reducers are constructed as integrators in this embodiment, but may also be realized, for example, by slowly changing-over bistable flipflop circuits. When the counting direction is changed from subtracting to adding, the condition signal applied to the condition input 60 is changed, for example, from low to high, which means a change from a negative voltage to a positive voltage. The capacitor 62 will first be discharged via resistor 61 after which it will be charged to this positive voltage. The voltage applied to the gate electrodes *p* of the field-effect transistors 26, 36 and 46, consequently, will slowly increase so that the resistances of the conducting paths between the input and output electrodes of these field-effect transistors will slowly decrease. As the voltages on the input terminals 260, 360 and 460 of the capacitors 28, 38 and 48 are determined by the output voltages of the $\overline{Q}$ signal outputs prior to the instant of reversal of the counting direction, the voltages between the input and output electrodes of the field-effect transistors 26, 36 and 46 are largest when the resistances of the conducting path between the input and output electrodes are largest. Consequently, small currents will flow through the conducting paths. These voltages change the voltage of the input terminals 260, 360 and 460 of the capacitors 28, 38, 48 such that the voltage difference across the conducting paths decreases. The resistance of the conducting paths decreases further under the control of the slowly changing voltage on the gate electrode. It is thus achieved that the voltage decrease and the resistance decrease approximately keep pace with each other, so that the currents flowing in the conducting paths during the reversal of the counting direction have a small value.

The voltage variation of the condition signal applied to the condition input 70 is opposed to that applied to the condition input 60. The capacitor 72 will first be discharged after which it will be charged to the negative voltage of the condition signal.

The voltage applied to the gate electrode *p* of the field-effect transistors 27, 37 and 47 slowly decreases so that the resistances of the conducting paths between the input and the output electrodes slowly increase. The voltage difference across these conducting paths also increases slowly due to the fact that the voltages of the input terminals 260, 360 and 460 of the capacitors 28, 38 and 48 are changed by the currents through the field-effect transistors 26, 36 and 46. Consequently, the currents flowing in the conducting paths of the field-effect transistors 26, 36 and 46 during reversal of the counting direction also have a small value.

The charge variations per unit of time of the capacitors 28, 38 and 48 are equal to the difference of the currents through the field-effect transistors 26 and 27, 36 and 37, 46 and 47 and, consequently, are small. The accompanying charging and/or discharging currents through the resistors 29, 39 and 49 cause negative and/or positive voltage peaks of a small amplitude across these resistors. The RC-times of the resistors the capacitor 62 with the resistor 61, and of the capacitor 72 with the resistor 71, are chosen such that the small amplitude of the negative voltage peaks determined by these Rc-times, cannot change the state of the counting flipflops, so that the counting position of the counting device is maintained.

In the same way, it is achieved that the counting contents of the counting device are maintained when the counting direction is changed from adding to subtracting.

Each of the coupling circuits of this counting device according to the invention comprise two field-effect transistors and one differentiator. With respect to the coupling circuits of the known counting device shown in FIG. 1, they comprise one capacitor and one resistor less, and instead of two diodes, they comprise two field-effect transistors. Consequently, these coupling circuits can be more readily realized by integration and they require less crystal area than the known coupling circuits.

Figure 3:
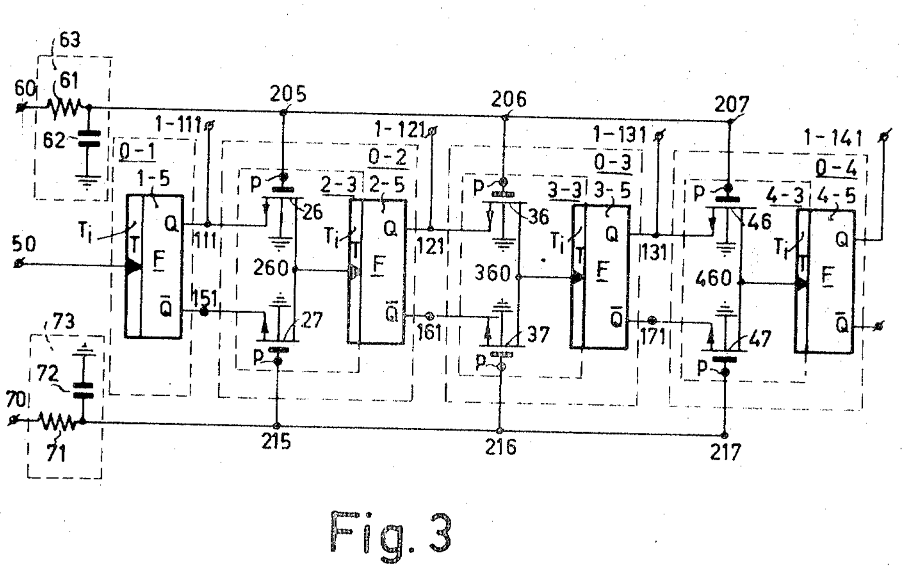
FIG. 3 shows a second embodiment of an asynchronous adding-subtracting device according to the invention.

The embodiment shown in FIG. 3 illustrates a further simplification of the counting device according to the invention, the counting device thus being particularly suitable for construction from existing logic elements.

The components in FIGS. 2 and 3, which are denoted by the same reference numerals, have a corresponding operation. The embodiment of the counting device shown in FIG. 3 comprises, for example, four sections 0–1, 0–2, 0–3 and 0–4.

These sections comprise dynamically controlled counting flipflops 1–5, 2–5, 3–5 and 4–5. The output voltages of the signal outputs Q and $\overline{Q}$ of these counting flipflops change over from high to low or vice versa, only if the voltage applied to the counting input T changes sufficiently quickly from high to low, or in other words, only if negative voltage variations of sufficient steepness occur on the counting inputs T. These dynamically controlled counting flipflops comprise input circuits $T_i$ performing the function of the differentiators 28, 29; 38, 39; and 48, 49 of the embodiment shown in FIG. 2, and bistable elements F perform the function of the counting flipflops 2–3, 3—3, and 4–3. The section 0–2, 0–3 and 0–4 comprise coupling circuits 2–3, 3—3 and 4–3, each of which comprises two field-effect transistors 26, 27; 36, 37; and 46, 47. Moreover, the input circuits $T_i$ of the dynamic counting flipflops 2–5, 3–5 and 4–5 are assumed to form part of the coupling circuits. The output electrodes of the field-effect transistors 26, 27; 36, 37; and 46, 47 are connected directly to the counting inputs T of the dynamic counting flipflops 2–5, 3–5 and 4–5 via the input terminals 260, 360 and 460. No further differences exist between the embodiment shown in FIG. 3 and that shown in FIG. 2.

The steepness of the signal variations applied to the counting inputs T of the dynamic counting flip-flops 1–5, 2–5, 3–5 and 4–5, caused by the trailing edge of the counting pulses applied to the counting pulse input 50, and caused by the voltage variations occurring on the signal output terminals Q and $\overline{Q}$ of the dynamic counting flipflops 2–5, 3–5 and 4–5, is sufficient to change the state of these dynamic counting flipflops. Consequently, the counting pulses applied to the counting pulse input terminal 50 increase or decrease the counting contents of the counting device in accordance with the condition signals applied to the condition inputs 60 and 70 in the same way as in the embodiment shown in FIG. 2.

The steepness of the signal variations occurring on the counting pulse inputs T due to the change-over of the counting direction of the counting device is determined by the RC-times of the resistor 61 and the capacitor 62 of integrator 63, and of the resistor 71 and the capacitor 72 of the integrator 73.

These RC-times are chosen to be such that the voltage variations supplied by these integrators 63 and 73, when the counting direction is reversed, cause a resistance variation of the conducting paths of the field-effect transistors 26, 27; 36, 37; and 46 47 such that the steepness of the resultant voltage variations of the input electrodes of the field-effect transistors, is less than is required for changing the state of the dynamic counting flipflops 2–5, 3–5 and 4–5, so that the counting contents are maintained upon reversal of the counting direction.

The counting device thus constructed can be readily composed of field-effect transistors and logic construction elements of the dynamically-controlled counting-flipflop type.

What is claimed is:

1. An asynchronous adding-subtracting device comprising a counting pulse input terminal for receiving counting pulses, two condition inputs for receiving two condition signals determining the counting direction, and a cascade connection of a number of sections, the first section of which comprises a counting flipflop, the remaining number of sections each comprising a coupling circuit and a counting flipflop, in which the counting flipflops are provided with a counting input and two signal outputs supplying inverted output signals, the counting input of the first counting flipflop being connected to the counting pulse input terminal, each coupling circuit comprising a differentiator provided with a signal input and a signal output terminal, two input terminals which are connected to the signal outputs of the counting flipflops of the preceding section, one output terminal which is connected to the counting input of the counting flipflop of the same section, and two control terminals which are coupled to the condition inputs, each coupling circuit comprises two electronic switches, each of which is provided with a control input and a conducting path, the control inputs forming the control terminals of the coupling circuit, the conducting paths of the switches being provided between the input terminals of the coupling circuit and the signal input terminal of the differentiator, the signal output terminal of the differentiator being connected to the output terminal of the coupling circuit, each condition input being connected to a control terminal of each coupling circuit via a pulse-slope reducer for gradually switching on the switch coupled to the control terminal after the condition signal has been switched on.

2. An asynchronous adding-subtracting device as claimed in claim 1, wherein the electronic switches are formed by field-effect transistors.

3. An asynchronous adding-subtracting device as claimed in claim 1, wherein the pulse-slope reducers are formed by integrators.

4. An asynchronous adding-subtracting device as claimed in claim 1, wherein in each section the differentiator and the counting flipflop together are formed by one counting flip-flop of the type which changes its state when unipolar signal variations of sufficient steepness are applied to its counting input.

* * * * *